United States Patent
Wang et al.

(10) Patent No.: US 12,537,764 B2
(45) Date of Patent: Jan. 27, 2026

(54) RETRACING ROUTES OF OVERLAY PACKETS

(71) Applicant: Arista Networks, Inc., Santa Clara, CA (US)

(72) Inventors: Michael Chih-Yen Wang, British Columbia (CA); Prasanna Parthasarathy, Cupertino, CA (US); Navdeep Bhatia, Mountain View, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/622,381

(22) Filed: Mar. 29, 2024

(65) Prior Publication Data

US 2025/0310248 A1   Oct. 2, 2025

(51) Int. Cl.
*H04L 45/00* (2022.01)
*H04L 43/12* (2022.01)
*H04L 45/64* (2022.01)
*H04L 47/28* (2022.01)

(52) U.S. Cl.
CPC ............ *H04L 45/566* (2013.01); *H04L 43/12* (2013.01); *H04L 45/64* (2013.01); *H04L 47/286* (2013.01)

(58) Field of Classification Search
None
See application file for complete search history.

(56) References Cited

U.S. PATENT DOCUMENTS

| 11,405,298 | B2 | 8/2022 | Devaraj et al. |
| 2018/0241586 | A1 | 8/2018 | Li et al. |
| 2021/0352000 | A1* | 11/2021 | Devaraj ............... H04L 43/12 |
| 2021/0400029 | A1* | 12/2021 | Wang ............... H04L 63/0485 |

OTHER PUBLICATIONS

Nordmark et al., "Layer-Transcending Traceroute for Overlay Networks like VXLAN draft-nordmark-nvo3-transcending-traceroute-03", Jul. 2016, pp. 43.

* cited by examiner

*Primary Examiner* — Fadi Haj Said
(74) *Attorney, Agent, or Firm* — Tianyi He

(57) ABSTRACT

Techniques for tracing routes taken by data packets transmitted through an overlay network are disclosed. A system uses a first TTL value for selecting a number of hops in an underlay network and a second TTL value for selecting the number of hops in the overlay network. Initially, the system increments the first TTL value with each new probe packet while holding the second TTL value at zero or one. When an overlay network node is reached by one of the probe packets, the system increments the second TTL value with each new probe packet. While incrementing the second TTL, the system holds the first TTL value at a constant value higher than the first TTL value corresponding to when the overlay network node was reached.

20 Claims, 11 Drawing Sheets

RETRACING ROUTES OF OVERLAY PACKETS

TECHNICAL FIELD

The present disclosure relates to troubleshooting networks. In particular, the present disclosure relates to using probe packets to trace paths through overlay networks.

BACKGROUND

Networks transmit packets of information from a source device to a destination device through a series of routers and switches. The routers examine the destination addresses of packets and determine paths through a network to the destination based on routing tables. Because individual routers make separate decisions, packets originating from the same communication may take different routes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
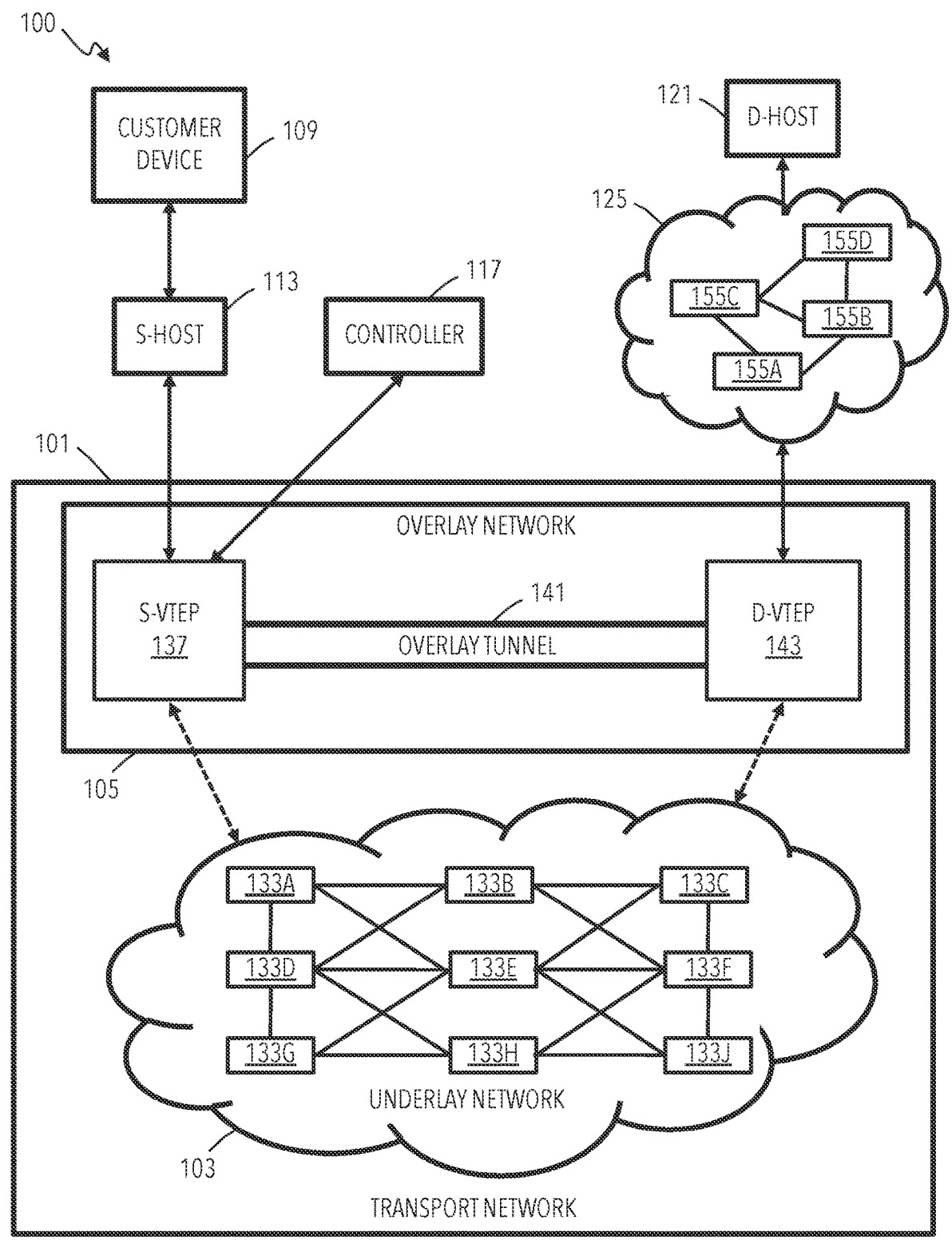
FIG. 1 illustrates a block diagram of an example network environment for sending and tracing packets via an overlay network in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. INTRODUCTION
2. GENERAL OVERVIEW
3. GLOSSARY
4. NETWORK ENVIRONMENT
5. ROUTE TRACING SYSTEM
6. ROUTE TRACING PROCESSES
7. EXAMPLE PROBE DATA PACKET
8. EXAMPLE ROUTE TRACING EMBODIMENT
9. COMPUTER NETWORKS AND CLOUD NETWORKS
10. HARDWARE OVERVIEW
11. MISCELLANEOUS; EXTENSIONS

1. Introduction

Traceroute is a network diagnostic tool used to determine routes traversed from the source to the destination. Traceroute provides network administrators information about devices a data packet traverses along a path, including a number of hops taken by the data packet, the round-trip time (RTT) for each hop, and the Internet Protocol (IP) addresses of the devices along the route. Using information obtained from Traceroute, network administrators can troubleshoot causes of delays and routing loops present in a network pathway to identify points of failure. For example, Traceroute can identify a hop along the route where a data packet is lost or delayed.

Traceroute typically uses Internet Control Message Protocol (ICMP) probe data packets having variable time to live (TTL) values. Traceroute transmits a series of probe data packets having different TTL values, where the TTL value of each packet is used as a counter. For example, when a probe data packet encounters a first node (e.g., a router or other network device), an initial TTL value is reduced by one. When the first probe data packet encounters a second node, the TTL value is reduced by one again. Once the TTL value of the first packet counts down to zero at a particular node, that node sends an ICMP error message informing the sender of the probe data packet information about the particular node, such as the node's unique IP address and the amount of time for the packet to arrive at the node. Subsequently, Traceroute transmits a second probe data packet having an incrementally higher initial TTL value. As such, the second probe data packet traverses at least one more node of the route than the first probe data packet. With each successive probe data packet having a greater TTL value, Traceroute determines additional nodes included in the route.

Some network architectures include overlay networks that are virtual networks built on top of the infrastructure of an underlying physical network. Overlay networks are used to add additional capacity, functionality, services, or virtualization to the underlying network. For example, Virtual Extensible LAN (VXLAN) is a network virtualization technology used to extend Open Systems Interconnection (OSI) Layer 2 network segments over an existing OSI Layer 3 infrastructure. However, because of the multiple layers, paths, and nodes involved in traversing overlay networks, conventional Traceroute operations performed in overlay networks are unable to identify devices over the entire path of a data packet through an overlay network.

2. General Overview

One or more embodiments determine a route of a dataflow by constructing and transmitting probe packets that (a) duplicate a portion of the packet headers of data packets corresponding to the dataflow to trigger the routing of the probe packets on a same route as the data packets and (b) use varying, respective Time-To-Live (TTL) values that result in the probe packets being dropped at various intermediate nodes along the route to trigger response messages that identify the intermediate nodes along the route. As an example, the TTL value for a current probe packet may be one higher than the TTL value in a previously sent probe packet, so both the current and previous probe packets are dropped at different consecutive intermediate nodes along the route. The system may increment the TTL value with each new probe packet. Alternatively, the system may increment the TTL value with every nth new probe packet that results in the dropping of n−1 probe packets at each intermediate node.

One or more embodiments order each of the intermediate nodes, identified by the responses to the probe packets, in a sequence to generate at least a portion of the route of the dataflow packets. Each of the intermediate nodes are ordered based in part on a respective number of hops taken by the probe packets to reach the intermediate nodes. The system identifies a particular network device as the source device of the probe packets for the response messages, from the various intermediate nodes, to be returned to the particular network device. A particular network device may construct and initiate transmission of the probe packets based on a request to trace the dataflow. Furthermore, the particular network device may itself be on the route of the dataflow packets, and, consequently, the determined portion of the route corresponds to the portion of the route between the particular network device and the destination device for the data packets.

In an embodiment, using varying, respective TTL values for the probe packets includes using both a first TTL value for selecting a number of hops in an underlay network and a second TTL value for selecting the number of hops in an overlay network. Initially, the system increments the first TTL value, corresponding to the number of hops in the underlay network, with each new probe packet while holding the second TTL value corresponding to the number of hops in the overlay network at zero or one. When an overlay network node is reached by one of the probe packets, the system may increment the second TTL value corresponding to the number of hops in the overlay network with each new probe packet. While incrementing the second TTL, the system holds the first TTL value at a constant value higher than the first TTL value corresponding to when the overlay network node was reached.

One or more embodiments described in this Specification and/or recited in the claims may not be included in this General Overview section.

3. Glossary

Example definitions of components and concepts, as referenced herein, are included below for ease of understanding. The example definitions are not intended to be complete or necessary. The example definitions should not be construed to limit the scope of the claims.

A Transport Network, as referred to herein, may include a computing network infrastructure managed and/or operated by a network service provider to transmit data, voice, and video traffic over long distances. Transport networks are used to connect various network elements, such as data centers, access networks, and service providers into a unified and interconnected system.

An Underlay Network, as referred to herein, may include a layer of a network providing connectivity and transport services where overlay networks are built. An underlay network is the physical infrastructure comprising the hardware and connections that make up a network, including routers, switches, and data centers. An underlay network establishes and maintains connectivity between devices and network segments that route packets or frames from sources to destinations.

An Overlay Network, as referred to herein, may include a virtual network operating on top of an underlay network. Overlay networks introduce additional layers of functionality, abstraction, or services to an underlay network, allowing for greater flexibility, security, and scalability. Overlay networks, such as Virtual Private Networks (VPNs) or Software-Defined Networking (SDN) overlays, are built on top of the underlay network and add layers of abstraction and services providing security, virtualization, or network segmentation.

A Virtual Local Area Network (VLAN), as referred to herein, may include a network segmentation technique used in computer networking to logically divide a physical network into multiple isolated and independent domains. VLANs enable network administrators to group devices, such as computers, servers, or switches, into separate virtual networks, regardless of their physical location on the same network infrastructure.

A Virtual Extensible LAN (VXLAN), as referred to herein, may include a network establishing VLAN functionality over a hybrid Layer 2/Layer 3 network. Components of a VXLAN may send a Layer 2 VLAN packet to a VXLAN tunnel endpoint (VTEP). The VTEP encapsulates the VLAN packet in a VXLAN packet and transmits the resulting VXLAN packet over the Layer 3 network. A second VTEP in the destination network receives and decapsulates the VXLAN packet to obtain the original VLAN packet and forwards the original VLAN packet over the Layer 2 network. The virtual path between the VTEPs is referred to as a VXLAN tunnel.

A Virtual Tunnel Endpoint (VTEP), as referred to herein, may include a component of an overlay network such as a VXLAN. A VTEP functions as a gateway or endpoint device that connects the virtualized overlay network with the underlying physical network infrastructure. A VTEP functions to encapsulate data packets entering the overlay network and decapsulate data packets leaving the overlay network. A VTEP can act as an ingress VTEP or an egress VTEP, depending on the received packet. An ingress VTEP receives an original frame (e.g., Ethernet frame) for transmission across the VXLAN tunnel as a VXLAN packet. An egress VTEP receives a VXLAN packet from the VXLAN tunnel and decapsulates the received VXLAN packet to recover the original frame.

A Packet, as referred to herein, may include a segment of data comprising a sequence of binary digits, including data and control signals arranged in a specific format that can be sent from one computer or network device to another computer or network device over a transport network. Packets may contain information such as a source, a destination, a size, and other information used by network devices to route the packet to the destination. A packet may include a header and a payload.

Packet Encapsulation, as referred to herein, is a networking process in which a data packet (e.g., a frame) is wrapped within another packet, adding headers or additional information to the original data packet. Encapsulation allows the packet to traverse a network through different network layers or domains, while preserving information needed for proper routing, transmission, and delivery to a destination. Encapsulation involves adding a new header to the original data packet containing information such as source and destination addresses, protocol information, error-checking data (e.g., checksums), time-to-live (TTL), and other such control information. The original data packet (payload) remains intact within the encapsulated packet and contains the data being transmitted, such as a file, email message, or web page element. The newly added header, along with the original packet, forms the encapsulated packet. This encapsulated packet has an "outer" layer (the added header) and an "inner" layer (the original data packet).

A Packet Header, as referred to herein, may be a component of a packet that includes fields containing information for routing, forwarding, and processing the packet by network devices along a route. An example packet header can include one or more of a source address, destination address (e.g., MAC address and IP address), packet length, protocol information (e.g., TCP, UDP, ICMP, MPLS, etc.), TTL, error checking information, and quality of service (QOS) information.

A Packet Payload, as referred to herein, may be a component of a packet including original data being carried by a packet from a source to a destination. For example, a payload of a packet for Web browsing may contain data encoding content of a web page, images, scripts, and other resources. The payload of a packet for file transfer may contain text, image, video, or any other type of file. The payload of a packet for a streaming session may contain compressed frames of a video.

A 5-Tuple, as referred to herein, may be a set of five values that uniquely identify a network connection or dataflow, including the following elements: source IP address, source port, destination IP address, destination port, and transport protocol. The source IP address is the IP address of the sender or the origin of the network traffic that uniquely identifies the source device or host on the network. The source port is the port number used by the application or service on the sender's device. The destination IP address is the IP address of the destination device or host where the network traffic is being sent.

A Customer, as referred to herein, may be an organization or individual subscribed to the services of a transport network. A customer can use the transport network to access various content and services as well as communicate with other networks and devices. A customer can include, for example, an enterprise that operates offices, data centers, and remote locations. A customer can also include a business using the transport networks for internet connectivity, cloud services, Virtual Private Networks (VPNs), and other networking solutions, data centers that host websites, applications, content servers, and cloud services. In addition, a customer can include an individual using the transport network to access the World Wide Web, content streaming, and other online services.

A Router, as referred to herein, may be a device in computer networking that connects different networks together and directs data traffic between them. Operating at the network layer of the OSI model, routers use routing tables and algorithms to determine the best path for data packets to reach intended destinations. These devices function as traffic controllers for data on the internet, ensuring efficient packet forwarding based on destination IP addresses.

A Switch, as referred to herein, may be a device in computer networking that connects and manages devices within a local area network (LAN). Operating at the data link layer of the OSI model, switches utilize MAC (Media Access Control) addresses to determine the appropriate path for data packets to reach their intended recipients. Switches intelligently forward data to specific devices the data is destined for.

A Routing Hash, as referred to herein, may be a value uniquely identifying a path for routing packets. The routing hash may be determined by applying a hashing algorithm to routing information of a packet, such as the 5-tuple. For example, the routing hash can be an Equal-Cost Multi-Path (ECMP) hash.

ECMP routing, as referred to herein, is a technique used in computer networking to distribute network traffic across multiple equal-cost paths through the network. In ECMP routing, multiple paths to the same destination have the same cost, such that individual paths are equally desirable for forwarding traffic.

A Control Plane, as referred to herein, is an element of a network architecture that controls and manages data traffic transmitted through the network. A control plane determines how data should be forwarded and routed. Additionally, control plane can configure network devices.

A Data Plane, as referred to herein, is an element of a network architecture that forwards and transmits data packets within a transport network from one device to another.

Virtual Routing and Forwarding (VRF), as referred to herein, is a network technology allowing a single router to maintain more than one routing table. In the context of a VXLAN, VRF and VXLAN can be used together to segment networks allowing the virtual networks to have routing tables while also extending Layer 2 network segments over a Layer 3 infrastructure. In a multi-tenant environment, individual customer VRFs have separate routing tables that isolate routes and network topology of a particular customer from other customers.

4. Network Environment

FIG. 1 illustrates a block diagram of an example network environment 100 in accordance with one or more embodiments. The network environment 100 includes a transport network 101 comprising an underlay network 103 and an overlay network 105. The network environment also includes a customer device 109, a source host 113, a controller 117, a destination host 121, and a local network 125 communicatively connected to the transport network 101 via one or more communication links. The communication links can be wired and/or wireless information channels, such as the Internet, intranets, Ethernet networks, wireline networks, wireless networks, mobile communications networks, and/or other communication networks. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The overlay network 105 can be a virtual network implemented using the components of the underlay network 103. The underlay network 103 can include nodes 133 connecting a source VTEP 137 to a destination VTEP 143 of the overlay network 105. The overlay network 105 provides packet transport via an overlay tunnel 141. The overlay tunnel 141 can be one of multiple virtual tunnels maintained by the overlay network. In example embodiments described below, the overlay tunnel 141 is a VXLAN tunnel. Other embodiments use tunneling protocols such as Generic Routing Encapsulation (GRE), IP in IP (IPIP), and Layer 2 Tunneling Protocol (L2TP). The VTEPs 137 and 143 can be physically connected by the nodes 133 of the underlay network 103, which may be routers, switches, reflectors, and the like.

The VTEPs 137, 143 are network devices that serve as entry and exit points for the overlay tunnel 141. The VTEP 137 and VTEP 143 can be routers, switches, or other suitable network devices that connect the overlay network 105 with the physical network infrastructure of the underlay network 103. For example, the VTEPs 137, 143 can be Layer 3 switches that perform packet switching (Layer 2) functionality, where packets can be switched among host machines, such as source host 113 and controller 117, connected to the switches' ports. The VTEPs 137, 143 can also perform packet routing (Layer 3) functionality, where packets are routed from one switch (e.g., VTEP 137) to another switch (e.g., VTEP 143). In operation, the source VTEP 137 encapsulates data packets (e.g., Ethernet frames) entering the overlay network 105 from the source host 113 and forwards the data packets over the underlay network 103. The destination VTEP 143 receives the encapsulated data packets, decapsulates the received packets, and forwards the original data packets to the destination host 121. The VTEPs 137, 143 are associated with respective Internet Protocol (IP) addresses. Some embodiments of the VTEPs 137, 143 include functionality that processes the received packets in accordance with the VXLAN protocol.

The customer device 109 can be one or more computing devices enabling a customer to access and interact with the source host 113 to transmit data to the destination host 121 via the transport network 101. For example, the customer device 109 can be a personal computer, workstation, server, mobile device, and/or other processing device capable of implementing and/or executing server processes, software, applications, etc. The customer device 109 can include one or more processors that execute software or other computer-readable instructions and may include a memory to store the software, other computer-readable instructions, and data. The customer device 109 can also include a network device to communicate data with the source host 113 via the communication links.

The source host 113 and destination host 121 can be one or more computing devices that manage communication, access, and operations among the client devices such as customer device 109. Some embodiments of the source host 113 and the destination host 121 can be physical servers, virtual machines, or any device capable of sending Ethernet frames. Hosts 113 and 121 can be physical servers, virtual machines, or any device capable of sending and receiving Ethernet frames. For example, the source host 113 can generate an Ethernet frame for transmission of data from the customer device 109. The destination host 121 can receive the Ethernet frame after it has been decapsulated by the VTEP 143 at the destination and process the Ethernet frame as if the Ethernet frame had been sent directly within the local network 125, which can be a Layer 2 network.

The controller 117 can be hardware, software, or a combination of hardware and software that allow network administrators to manage and control the transport network 101. The controller 117 can be, for example, a desktop computer, a workstation, a server, or other suitable computing device. The controller 117 can also be, for example, a software application, a program module, or the like, executable by a computing device, such as a desktop computer, a workstation, a server, a router, or a network switch. The controller 117 can generate an interface used by network administrators to configure and monitor the transport network 101. These interfaces may be accessible via a command-line interface (CLI), a web-based interface, or other management tools. Additionally, the controller 117 may execute software applications for network management and monitoring allowing administrators to track the performance of the network, troubleshoot issues, and make configuration changes. As described in greater detail below, the controller 117 can initiate a Traceroute session by controlling the network (e.g., source VTEP 137) to generate and send a series of probe data packets with increasing time-to-live (TTL) values for each successive probe to resolve dataflow paths of the customer through the underlay network 103, the overlay network 105, and the local network 125. Using debugging information obtained in response to the series of probe data packets, the controller 117 can determine the route taken by packets of a customer's dataflow through the underlay network 103 and overlay network 105. While controller 117 is illustrated in FIG. 1 as a separate device, some or all of the functionality of the controller can be incorporated in another device such as VTEP 137.

In the non-limiting example illustrated in FIG. 1, overlay network 105 can be a VXLAN using Equal-Cost Multi-Path (ECMP) routing. The computing environment 100 transmits information from the customer device 109 in a target dataflow from the source host 113 to the destination host 121. The source VTEP 137 encapsulates data packets from the source host 113 in the target dataflow by adding a VXLAN header to the data packets and sending the resulting VXLAN frames to the network node 133A. The VXLAN frames are then transmitted from the source VTEP 137 to the destination VTEP 143 through underlay network 103 based on IP routing. The network node 133A performs ECMP routing to determine whether to send the VXLAN frames to a next hop, such as node 133E. Individual network nodes receiving a VXLAN frame performs ECMP routing to send the VXLAN frame on its next hop toward the destination VTEP 143. The destination VTEP 143 decapsulates the data packets by removing the VXLAN header from the VXLAN frame and sends the resulting, original data packets to the destination host 121 via the local network 125.

As described above, embodiments determine the path of the target dataflow by generating and transmitting probe data packets. For example, transmission issues may result in the delay or loss of packets in the dataflow. To troubleshoot the transmission issues, the controller 117 can request the VTEP 137 to perform a Traceroute session. The Traceroute session generates and sends a series of probe data packets with increasing time-to-live (TTL) values for each successive probe data packet to resolve the path of the target dataflow through the underlay network 103 and the overlay network 105. In response to a Traceroute request from the controller 117, the source VTEP 137 generates probe data packets mimicking routing hash information of the target dataflow. Thus, the transport network 101 transmits the probe packet along an identical path as the target packets of the target dataflow. Additionally, the probe data packets specify the VTEP 137 as the packet source such that VTEPs 137, 143, nodes 133, and nodes 155 return debugging information to the VTEP 137 system instead of the source host 113. The controller 117 logs the debugging information received by the VTEP 137, and after resolving the route of the target dataflow through the underlay network 103 and overlay networks 105, the controller 117 determines the entire route of the dataflow.

5. Route Tracing System

Figure 2:
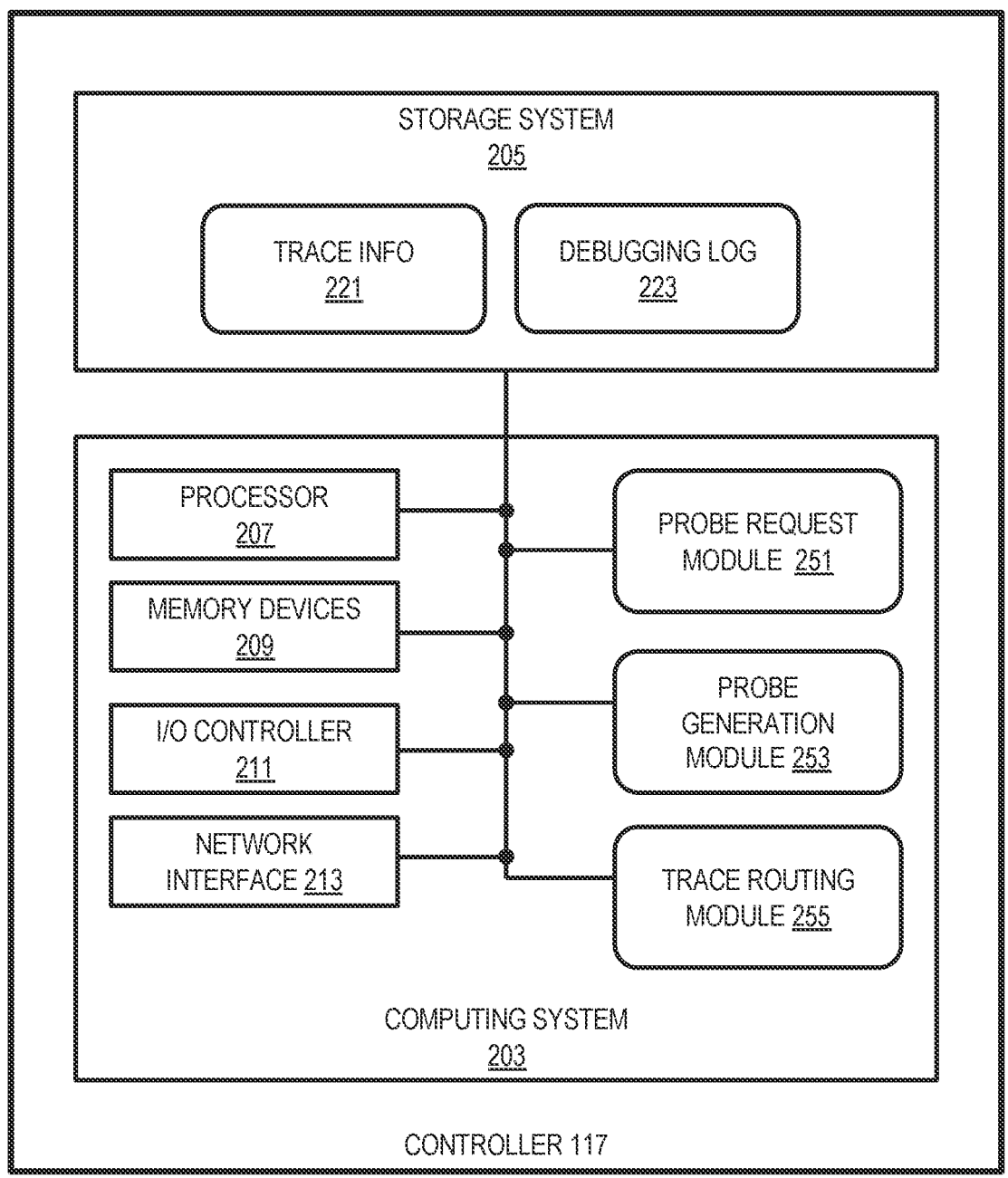
FIG. 2 illustrates a block diagram of an example system for tracing routes of packets in accordance with one or more embodiments.

FIG. 2 illustrates a block diagram of an example controller 117 for generating probe packets and determining a path of a target dataflow based on debugging information generated by an overlay network in response to the probe data packets. The controller 117 can be the same or similar to that previously described above. In one or more embodiments, the controller 117 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component. For example, some or all of the components can be incorporated in a control plane host device or a VTEP (e.g., VTEP 137).

The controller 117 can include a computing system 203 and a storage system 205. The computing system 203 can include one or more processors 207, one or more memory devices 209, an input/output (I/O) controller 211, and a network interface 213 operatively and communicatively connected. The processor 207 can be one or more general-purpose processors, special-purpose processors, or other programmable data processing apparatuses providing the functionality and operations detailed herein. For example, the processor 207 can be a microprocessor, a microchip, or an application-specific integrated circuit. The memory device 209 includes one or more types of memory structures. For example, the memory structures can include random access memory (RAMs) units, read only memory (ROMs), flash memory (e.g., solid state drives (SSDs)), electrically erasable/programmable read only memory (EEPROMs), etc. The I/O controller 211 can recognize and process user inputs and direct outputs for communication to the user. The I/O controller 211 can also function as an intermediary between the processor 207 and one or more output devices to control information and dataflow with the devices. The network interface 213 can be a device or module providing wired and/or wireless network communications with external devices.

The storage system 205 can comprise one or more non-transitory computer-readable, hardware storage devices that store information and computer-readable program instructions used by the processes and functions disclosed herein. For example, the storage system 205 can include one or more flash drives and/or hard disk drives. Additionally, the storage system 205 can store trace information 221 and a debugging log 223. The trace information 221 can store 5-tuple information of a target dataflow or target data packet to be traced. The controller 117 can obtain the trace information 221 from a customer or a network administrator, or by extracting the 5-tuple information from a target data packet obtained from a customer or a network administrator. For example, in response to a transmission issue with the target dataflow, a network administrator can input a 5-tuple to the controller for performing a Traceroute operation. The debugging log 223 can be a data structure storing debugging information received from debugging messages transmitted to the controller 117 in response to probe data packets of a Traceroute operation. For example, the debugging log 223 can store a time-ordered debugging information, including identifications, addresses, and response times of nodes communicated in response to the respective probe data packets. It is understood that some or all of the information stored in the storage system 205 can be stored at a location remote from the controller 117.

The controller 117 includes hardware, software, and/or combinations of hardware and software that perform processes and functions disclosed herein, including executing an operating system, controlling input/output components, generating computer-user interfaces, and communicating with network devices. Additionally, the computing system 203 can execute a probe request module 251, a probe generation module 253, and a trace routing module 255, that each can be software, hardware, or a combination thereof. The probe request module 251 can generate a computer-user interface enabling a user to initiate a Traceroute session. The probe generation module 253 can generate probe data packets, as described in greater detail below. The trace routing module 255 can maintain the debugging log 223 generated by network components in response to Traceroute operations, determine a path of the target dataflow through multiple virtual and physical networks (e.g., underlay network, 103 and overlay network 105), and generate an output describing the path and the components therein. For example, the trace routing module 255 can output a report including an ordered list of network devices in the path of the target dataflow and performance information of the individual network devices, such as delay, roundtrip time, and error messages.

It is noted that the controller 117 can comprise any general-purpose computing article of manufacture capable of executing computer program instructions installed thereon (e.g., a personal computer, server, etc.). However, the controller 117 represents various possible equivalent-computing devices that can perform the processes described herein. To this extent, in embodiments, the functionality provided by the controller 117 can be any combination of general and/or specific purpose hardware and/or computer program instructions. For example, the controller 117 can be a router, switch, VTEP, or other suitable network devices.

6. Route Tracing Processes

Figure 3A:
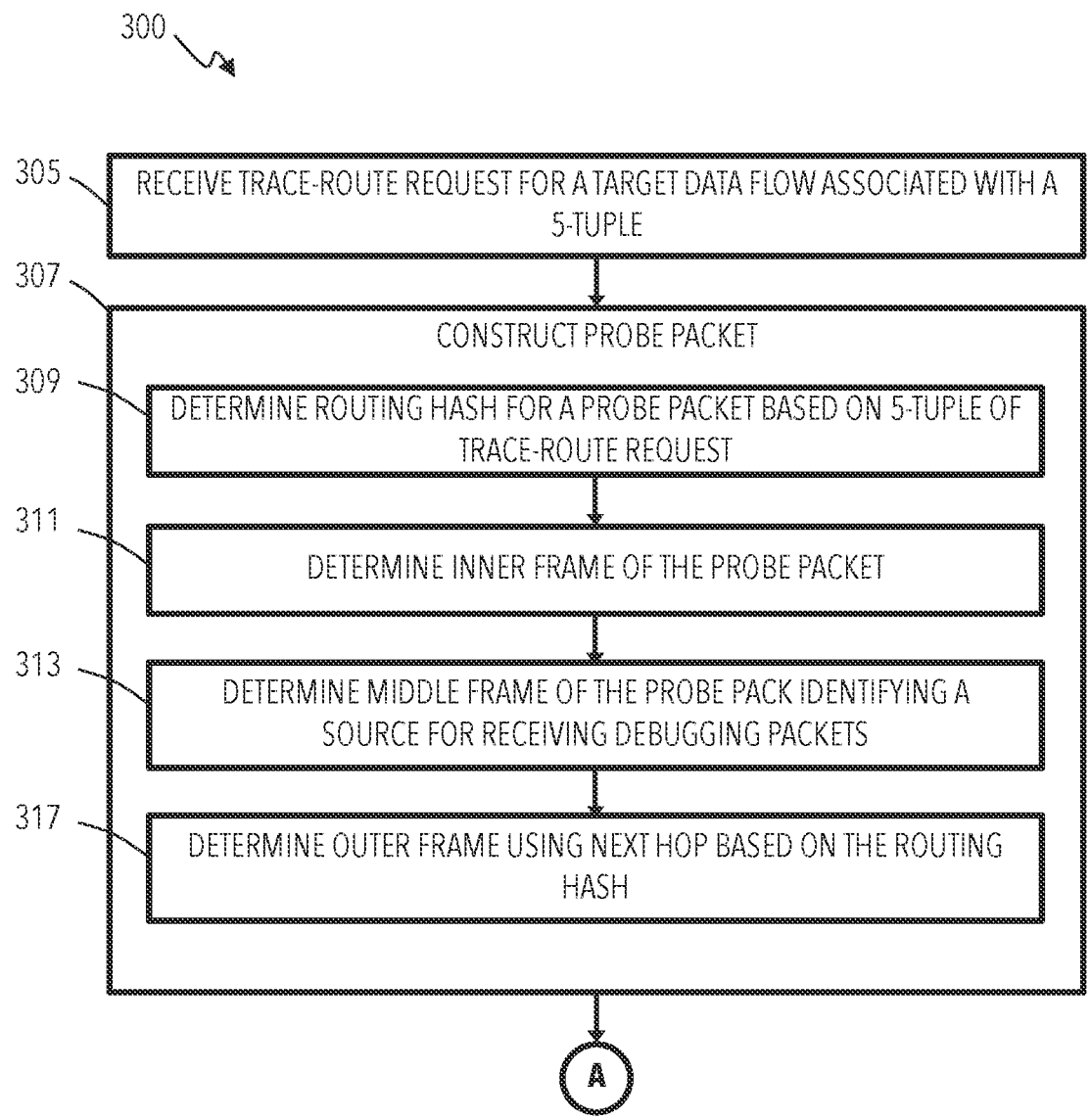
FIGS. 3A and 3B illustrate example sets of operations for tracing routes of packets through an overlay network in accordance with one or more embodiments.
Figure 3B:
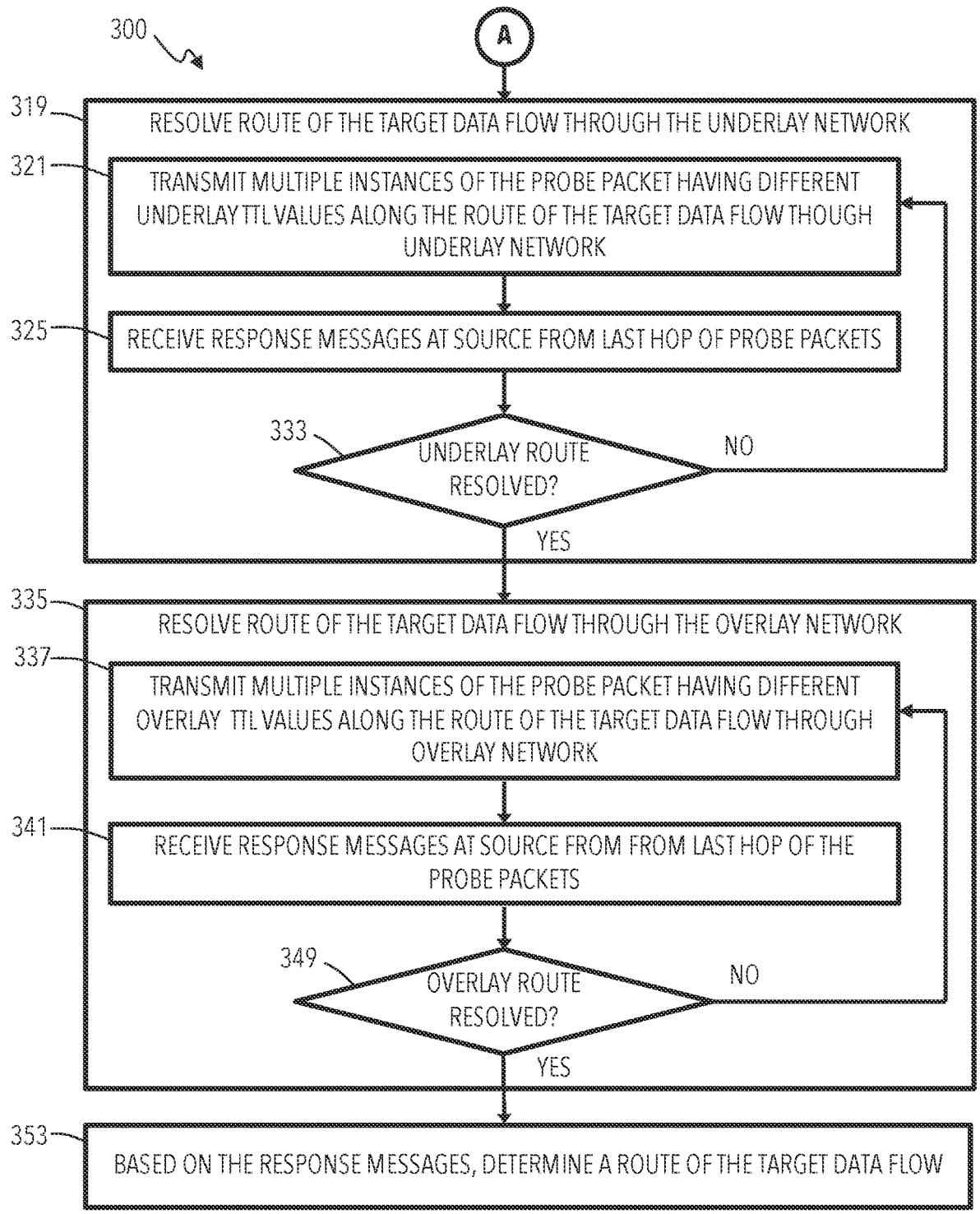

FIGS. 3A and 3B illustrate an example set of operations for tracing the routes of packets of a target dataflow through virtual and physical networks. One or more operations illustrated in FIGS. 3A and 3B may be modified, rearranged, or omitted all together. Accordingly, the particular sequence of operations illustrated in FIGS. 3A and 3B should not be construed as limiting the scope of one or more embodiments. Each block in FIGS. 3A and 3B can represent a module, segment, or portion of program instructions that include one or more computer executable instructions for implementing the illustrated functions and operations. Additionally, individual blocks and combinations of blocks in the flow diagrams can be implemented by special-purpose hardware-based systems that perform the specified functions or acts, or combinations of special-purpose hardware and computer instructions.

At block 305, a system (e.g., controller 117 executing probe request module 251) receives a trace-route request for a target dataflow associated with routing information identifying the target dataflow, such as a 5-tuple. The request can also identify a VRF of a customer. The dataflow can be a transmission of one or more data packets from the first device (e.g., source host 113) to a second device (e.g., destination host 121) through a network (e.g., transport network 101). For example, a customer (e.g., using customer device 109) may communicate to an administrator of a transport network that some or all of the packets in a dataflow are not reaching an intended destination (e.g., destination host 121). The system can store the routing information for future reference (e.g., as trace information 221 in storage system 205).

In response to the communication, the network administrator can request the system to initiate a Traceroute. The request can include information identifying the 5-tuple in the header of a target packet in the target dataflow. Using a computer-user interface of a network device (e.g., controller 117 or VTEP 137), the network administrator can input or upload the 5-tuple of the target data packet. As previously described, the 5-tuple can be set of five values that uniquely identify the target data packet. The values can include an IP address of the source of the target dataflow (e.g., IP address of source host 113), an IP address of the destination of the target dataflow (e.g., IP address of destination host 121), a port of the source (e.g., an output port of the source host 113), a port of the destination (e.g., an input port of the destination host 121), and a network protocol (e.g., UDP).

At block 307, the system (e.g., controller 117 executing probe generation module 253) constructs a probe data packet for tracing the route of the target dataflow. The system can construct multiple instances of the probe data packet based on the 5-tuple included in the header of the target data packet. Each instance of the probe data packet can include a probe packet header identifying a destination address identical to the destination address of the target data packet. Additionally, each instance of the probe data packet can have a different respective TTL value.

Constructing the probe data packet can include, at block 309, determining a routing hash for a probe data packet based on the 5-tuple of the trace-route request received at block 305. The system can apply a hashing algorithm to the values of the 5-tuple and generate a unique identifier from the combination of 5-tuple values. For example, the algorithm can be the CRC32 (Cyclic Redundancy Check) algorithm. Embodiments use the routing hash to determine values for an outer frame of a probe data packet mimicking the routing information included in the target data packet. As such, an underlay network will forward the probe data packet along the identical path as the target data packet.

Constructing the probe data packet can also include, at block 311, determining an inner frame of the probe packet. The inner frame can be a data structure comprising a header and a payload. The header can mimic the header of the target data packet, including the 5-tuple received at block 305. The payload of the inner frame can be left empty or contain dummy information.

Constructing the probe data packet can also include, at block 313, determining a middle frame of the probe packet identifying a source device (e.g., controller 117 or VTEP 137) for receiving debugging messages. The middle frame can be a data structure comprising routing information for an overlay network (e.g., an overlay header for overlay network 105) from a source VTEP (e.g., a source VTEP 137) to a destination VTEP (e.g., destination VTEP 143) through an overlay tunnel (e.g., overlay tunnel 141). The middle frame can include routing information substantially mimicking the information of the middle frame encapsulating the target data packet. Based on the routing information determined by the system for the middle frame of the probe data packet, the transport network will forward the probe data packet through the overlay network via the identical path taken by the target data packet. Unlike the middle frame of the target data packet, which may include the IP address of the source of the target data packet (e.g., source host 113), the middle frame of the probe data packet includes a local IP address for the source of the probe data packet (e.g., controller 117 or VTEP 137). Hence, debugging messages returned by the network in response to probe data packets will be directed to the source of the probe data packets rather than the source of the target data packet. For example, the middle frame can include a source IP address corresponding to the source VTEP, the IP address of the destination VTEP, the source port of the source VTEP, the destination port of the destination VTEP, an identifier of the overlay tunnel (e.g., virtual network identifier (VNI)), the network protocol of the transmission (e.g., UDP), and an initial TTL value for the overlay network (e.g., 1).

Constructing the probe data packet can also include, at block 317, determining an outer frame of the probe data packet using a next hop of the target packet based on the routing hash determined at block 309. The outer frame can be a data structure comprising routing information for the underlay network (e.g., underlay network 105) from the source VTEP (e.g., VTEP 137) to the destination VTEP (e.g., VTEP 143). The information in the outer frame can substantially mimic the routing information that would be generated by the system for an outer frame encapsulating the target data packet. The outer frame identifies a source port used for determining a next hop as the routing hash determined at block 309 using the 5-tuple of the target data packet. Based on the routing information generated by the system for the outer frame of the probe data packet, the transport network will forward the probe data packet through the underlay network via the identical path taken by the target data packet. For example, the outer frame determined for the probe data packet can include the IP address of the source VTEP, the IP address of the destination VTEP, a source port equal to the routing hash, a destination port for the destination VTEP (e.g., default port 4789), an identifier of the overlay tunnel (e.g., virtual network identifier (VNI) of the overlay tunnel 141), and an initial TTL value for the underlay network (e.g., 1).

Referring to FIG. 3B, as indicated by off-page connector "A," at block 319 the system resolves the route of the data flow through the underlay network. Resolving the route through the underlay network includes, at block 321, transmitting multiple instances of the probe data packet constructed at block 307, wherein different instances have different underlay TTL values in the outer frame, while holding the overlay TTL value constant. Embodiments sequentially transmit the instances of the probe data packet having different TTL values in the outer frame, wherein the TTL value of each probe data packet is used as a countdown timer. For example, when a first probe data packet encounters a first node (e.g., node 133A), the TTL value is reduced by one. When the first probe data packet encounters a second node (e.g., node 133E), the TTL value is reduced by one again. Once the TTL value of the first probe packet reaches zero at a particular node, that node informs the source of the probe data packet that the probe data packet's TTL has expired at that location. In response to determining the TTL time has expired, the individual nodes of the underlay network drop the probe data packet. When a node drops a probe data packet, the node determines not to forward or transmit a network packet to its intended destination and, instead, can discard the probe data packet. Additionally, in response to determining the TTL time has expired, the node can respond to the probe data packet by returning debugging information to the source of the probe data packets.

Resolving the route through the underlay network includes, at block 325, receiving response messages from the respective last hops of the probe data packets in the underlay network. The response messages can be debugging messages, such as ICMP error messages, which identify the address of the last hop where the underlay TTL expired, and the probe packet was dropped. With each instance of the probe data packet, the system can log the response messages received in a data structure (e.g., debugging log 223) at the source of the probe data packets.

Resolving the route through the underlay network includes, at block 333, determining whether the underlay route of the target dataflow has been resolved. The system can determine the target dataflow is resolved when the last hop of the underlay network sending a debugging message is the destination of the packet in the underlay network. For example, the system can determine that the IP address of the last hop is the same as the IP address of the destination IP in the outer frame (e.g., IP address of the destination VTEP 143). If the underlay route is not resolved (e.g., block 333 is "No,"), then the process 300 returns to block 321. If the system determines that the underlay route has been resolved (e.g., block 333 is "Yes,"), then the process 300 proceeds to block 335

At block 335 the system resolves the route of the target data flow through the overlay network. Resolving the route through the overlay network includes, at block 337, transmitting multiple instances of the probe packet having different overlay TTL values in the middle frame and having the same underlay TTL value. The system holds the underlay TTL value at a constant value higher than when the underlay route was resolved. Embodiments sequentially transmit the instances of the probe data packet via the overlay network in a same or similar manner to that described above regarding the outer frame. The TTL value of the middle frame of each packet is used as a countdown timer in the overlay network. For example, when a first probe data packet encounters a first node of the overlay network (e.g., S-VTEP 137), the TTL value is reduced by one. When the first probe data packet encounters a second node (e.g., D-VTEP 143), the TTL value is reduced by one again. Once the TTL value of the first packet reaches zero at a particular node, that node informs the source of the probe data packet that the probe data packet's TTL has expired at that location. In response to determining the TTL time has expired, the individual nodes of the overlay network drop the probe data packet. When a node drops a probe data packet, the node determines not to forward or transmit a network packet to its intended destination and, instead, can discard the probe data packet. Additionally, in response to determining the TTL time has expired, the node can respond to the probe data packet by returning debugging information to the source of the probe data packets.

Resolving the route through the underlay network includes, at block 341, the system receiving response messages from the respective last hops of the probe data packets in the overlay network. As previously described, the response messages can be debugging messages, such as ICMP error messages, that identify the address of the last hop where the overlay TTL expired, and the probe packet was dropped. With each instance of the probe data packet, the system can log the response messages received at the source of the probe data packets. With each successive probe data packet resulting in a debugging message, the system receives and logs debugging information from additional nodes in the route of the target data packet.

Resolving the route of the target data flow through the underlay network includes, at block 349, determining whether the overlay route of the target dataflow has been resolved. The system determines that the target dataflow is resolved in the overlay route when the last hop sending a debugging message is the destination of the target packet in the overlay network. If not (e.g., block 333 is "No,"), then the process 300 returns to block 337.

If the system determines that the overlay route has been resolved (e.g., block 349 is "Yes,"), then at block 353, the system (e.g., controller 117 executing trace routing module 255) determines at least a portion of the overlay route of the target dataflow based on the response messages received at blocks 325 and 341. The overlay route can include nodes traversed by the dataflow through the overlay network and the underlay network. For example, using the logged debugging information, the system can generate a record or report sequentially listing each of the hops included in the route of the target dataflow, as identified by the probe data packets.

7. Example Probe Data Packet

Figure 4:
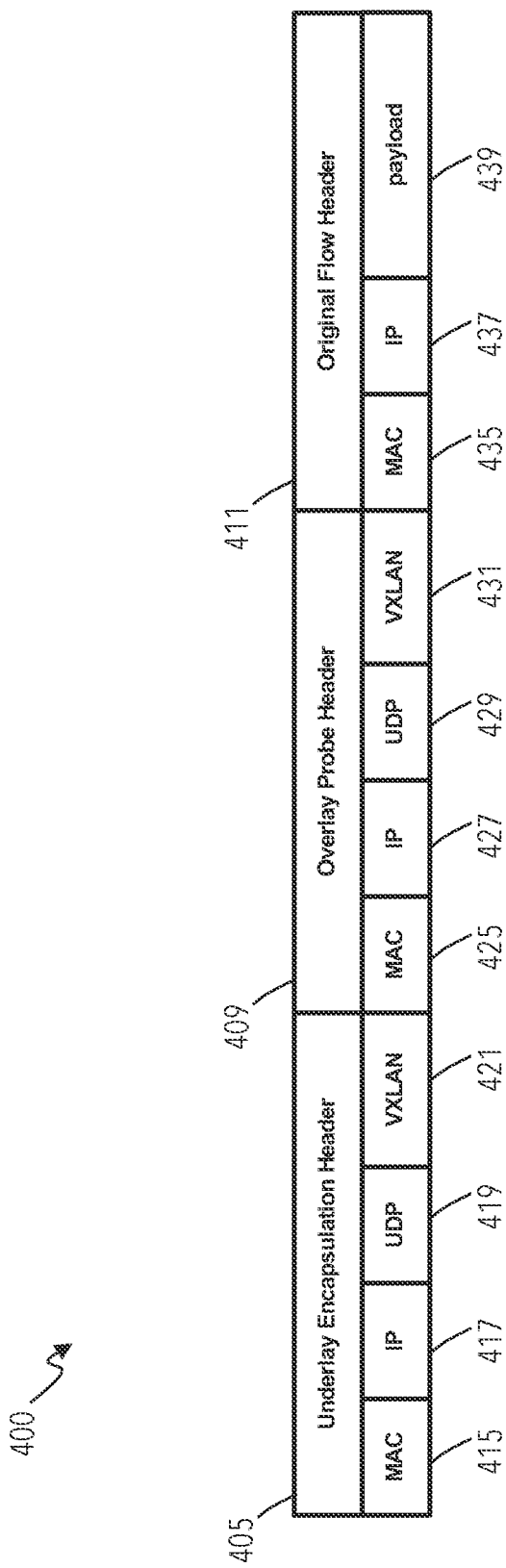
FIG. 4 illustrates a block diagram of an example probe data packet in accordance with one or more embodiments.

FIG. 4 illustrates an example data structure 400 of a probe data packet in accordance with one or more embodiments. The data structure 400 includes an underlay encapsulation header 405, an overlay probe header 409, and an original flow header 411. The underlay encapsulation header 405 can be the same or similar to the outer frame described above. The overlay probe header 409 can be the same or similar to the middle frame described above. The original flow header 411 can be the same or similar to the inner frame described above.

The underlay encapsulation header 405 can include the following: MAC field 415, IP field 417, UDP field 419, and VXLAN field 421. The MAC field 415 identifies the MAC addresses of the source and destination of the probe data packet in an underlay network (e.g., underlay network 103). The IP field 417 identifies a source IP address (e.g., VTEP 137 address) and destination IP address (e.g., VTEP 143 address) in the underlay network. The UDP field 419 can identify the UDP transmission protocol, a UDP destination port (e.g., 4789 by default or a custom value), a UDP source port, and an underlay TTL value. As described above, the UDP source port is a hash of the target data packet's 5-tuple. The underlay TTL value can be a variable value used for Traceroute in the underlay network. The VXLAN field 421 can include a VNI of the overlay tunnel (e.g., overlay tunnel 141).

The overlay probe header 409 can include the following fields: MAC field 425, IP field 427, UDP field 429, and VXLAN field 431. The MAC field 425 can identify the MAC address of the source and destination of the probe data packet in an overlay network (e.g., overlay network 105). The IP field 427 can identify a source IP address of the probe data packet and a destination IP address in the overlay network. The source IP address indicates the source of the probe data packet that can be a local address within the overlay network (e.g., an IP address of the controller 117 or the VTEP 137). The destination IP address can indicate a destination VTEP's overlay address or optionally, another node in the overlay network. The UDP field 429 can indicate the network protocol of the probe packet (UDP), a UDP destination port (VXLAN), a UDP source port (e.g., a reserved port), and a TTL modified for traceroute. The overlay TTL value can be a variable value used for Traceroute in the overlay network. The VXLAN field 431 can identify the overlay tunnel (e.g., overlay tunnel 141).

The original flow header 411 can include the packet header of a target data packet. The original flow header 411 can include the following: MAC field 435, IP fields 437, UDP fields 419, and payload fields 439. The MAC field 435 can identify the MAC address of source and destination MAC addresses of the target packet. The IP field 437 can indicate a source IP address (e.g., source host 113) and destination IP address (e.g., destination host 121). The payload can be left empty or set to a dummy value.

8. Example Route Tracing Embodiment

A detailed example is described below for purposes of clarity. Components and/or operations described below should be understood as one specific example that may not be applicable to certain embodiments. Accordingly, components and/or operations described below should not be construed as limiting the scope of any of the claims.

FIGS. 5A-5E show functional flow block diagrams illustrating an example Traceroute operation performed using probe data packets in an example network environment 100 in accordance with one or more embodiments. The network environment 100 can include an underlay network 103, overlay network 105, a customer device 109, a source host 113, a controller 117, a destination host 121, and a local network 125, nodes 133, VTEP 137, overlay tunnel 141, VTEP 143, and nodes 155 that each can be the same or similar to those previously described above.

In the present example, the dotted arrows 505 represent a target dataflow starting from the customer device 109 following a path through the transport network 101 and the local network 125 to the destination host 121. The customer device 109 sends data to the source host 113 for transmission to the destination host 121. The source host 113 can generate an Ethernet frame that includes the customer's data as a payload. A header of the Ethernet frame can include a 5-tuple for the dataflow that includes an IP address of the source host 113, an IP address of the destination host 121, an identifier of the UDP transmission protocol, a UDP port of the source host 113, and a destination UDP port of the destination host 121. Based on the destination of the Ethernet frame (e.g., destination host 121), the source host 113 transmits the Ethernet frame to the source VTEP 137 for routing to the destination. The source VTEP 137 encapsulates the Ethernet frame within a VXLAN header and sends the resulting VXLAN frame to the network node 133A.

The VXLAN frame is then transmitted through underlay network 103 based on IP routing. The VTEP 137 performs ECMP routing using a hash of the 5-tuple and determines to send the VXLAN frame to node 133A. The network node 133A performs ECMP routing and determines to send the VXLAN frame to a next hop, node 133E. Node 133E performs another ECMP routing and determines to send the VXLAN frame to the next hop, node 133C. Node 133C forwards the VXLAN frame to the destination VTEP 143 that decapsulates the Ethernet frame by removing the VXLAN outer header from the VXLAN frame. After decapsulation, the VTEP 143 forwards the resulting, middle frame to the destination host 121 via nodes 155 of the local network 125.

At the request of a customer or other entity, the controller 117 can trigger the transport network 101 to perform a Traceroute operation. In the present example, the solid arrows 509 represent a flow of probe information starting at the controller 117 for performing an example Traceroute of the dataflow illustrated by dotted arrows 505. As previously described, the Traceroute operation generates and sends multiple instances of probe data packet with different, respective, TTL values to resolve the dataflow path through the underlay network 103, the overlay network 105, and the local network 125.

In the present example, the controller 117 or source VTEP 137 ("probe source") generates a probe packet mimicking routing hash information of the target dataflow indicated by the dotted arrows 505. As a consequence of the mimicking, the transport network 101 transmits the instances of the probe packet having different TTL values along an identical path as the target data packets of the target dataflow. The probe data packets specify the probe source such that the networks 103, 105, and 125 return debugging messages to the probe source, as indicated by dashed arrows 513, instead of the source host 113 of the dataflow indicated by dotted arrows 505. The probe source logs the debugging message, and after resolving the path of the target dataflow through the underlay network 103 and overlay networks 105, the probe source determines the entire route of the target dataflow.

Figure 5A:
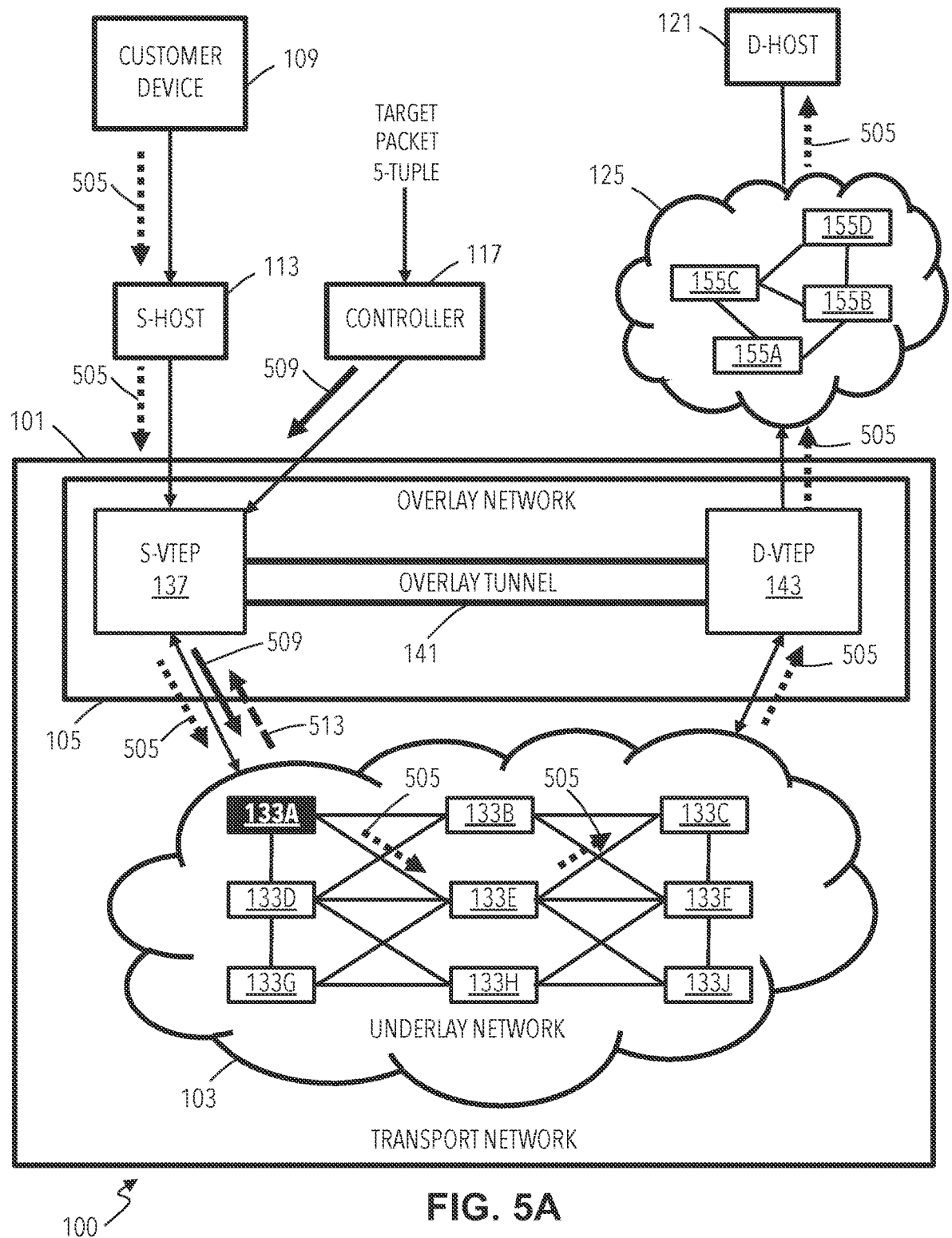
FIGS. 5A-5E illustrate block diagrams of an example process of tracing a path of a dataflow in accordance with one or more embodiments.

Referring to FIG. 5A, the Traceroute operation can generate and send a first probe data packet ("first probe") including an outer frame (e.g., underlay encapsulation header 405), a middle frame (e.g., overlay probe header 409), and an inner frame (e.g., original flow header 411), as previously described above. The Traceroute operation can send the first probe having an outer frame with a TTL value set to 1 and a middle frame with a TTL set to 1. Accordingly, based on the TTL values, the source VTEP 137 transmits the first probe to the underlay network 103. The source VTEP 137 can send the first probe to node 133A based on ECMP routing of the routing hash of the 5-tuple of the target dataflow. Based on the TTL value (1), the first probe's outer header with a TTL will decrement to zero at the first hop and time-out at node 133A. In response to the timing-out of the TTL in the outer frame, the node 133A drops the first probe and returns a debugging message, such as an ICMP error message, to the probe source, as indicated by dashed arrows 513. The probe source then logs the information included in the received debugging message (e.g., in debugging log 223) to determine a path of the target dataflow.

Figure 5B:
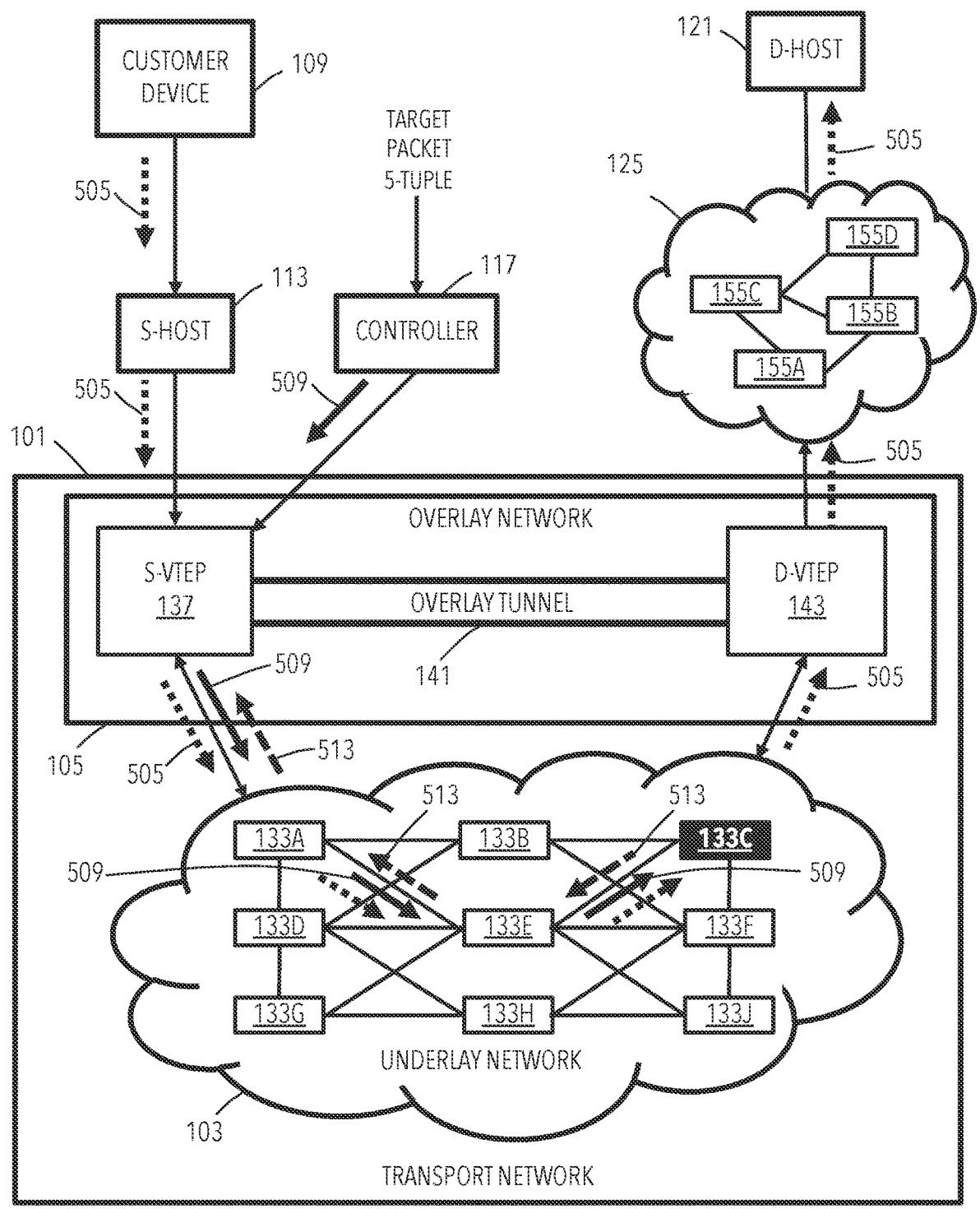

Referring to FIG. 5B, the Traceroute session can generate and send a second instance of the probe data packet ("second probe") having an outer frame with a TTL value set to 3 and a middle frame TTL held constant at 1. Accordingly, based on the TTL values, the source VTEP 137 transmits the second probe to the underlay network 103. Based on ECMP routing of the routing hash of the 5-tuple of the dataflow, the path of the second probe will follow the identical path as the customer's dataflow, as indicated by the solid lines 509 following the dotted lines 505. As node 133C is the third hop of the second probe (wherein, e.g., the first hop is node 133A, and the second hop is node 133E), the second probe's outer header TTL will decrement to zero at the third hop and time-out at node 133C. In response to the timing-out of the TTL in the outer frame, the node 133C will drop the second probe and return another debugging message to the probe source that logs the debugging message.

Figure 5C:
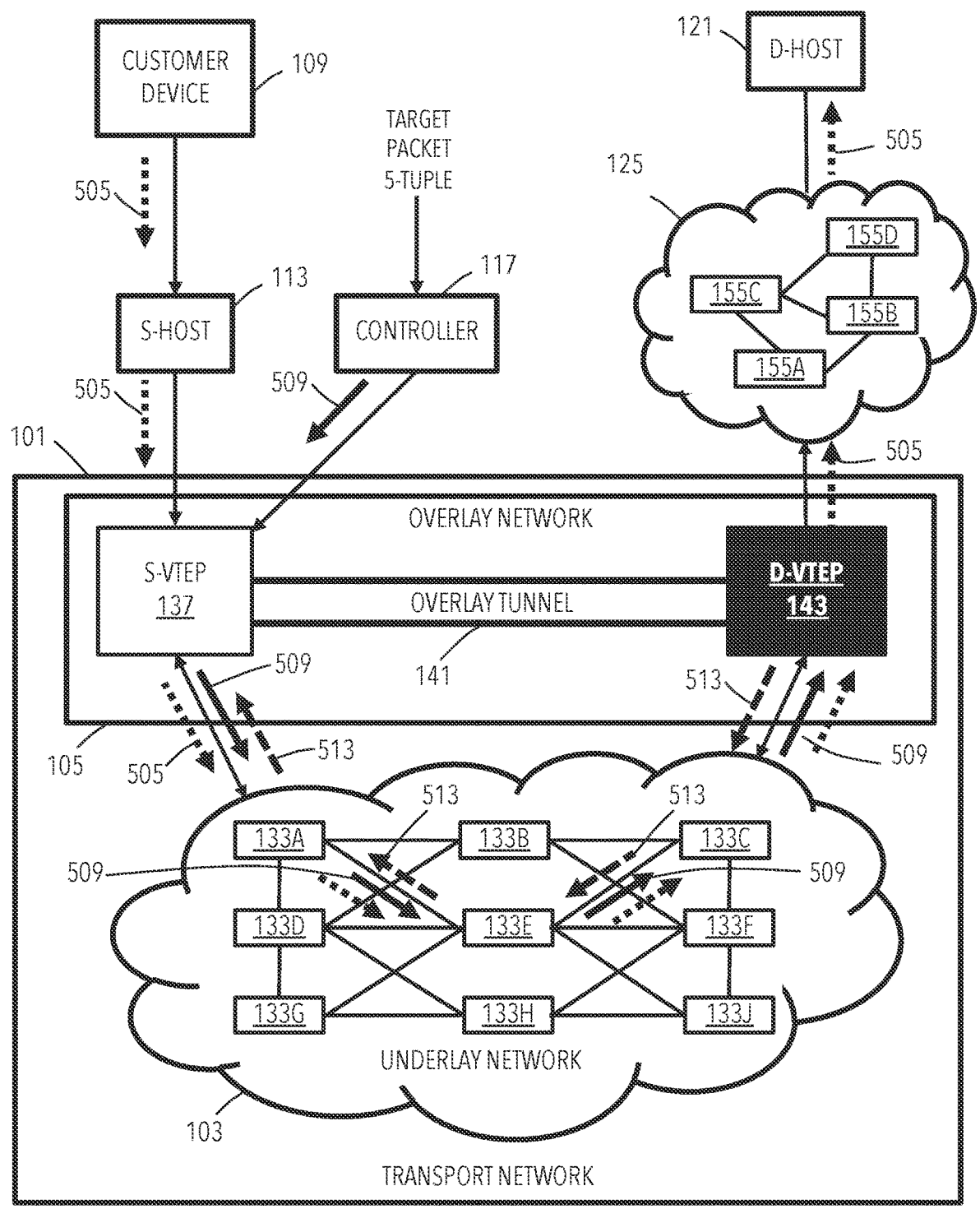

Referring to FIG. 5C, the Traceroute session can generate and send a third instance of the probe data packet ("third probe") having an outer frame with a TTL value set to 4 and a middle frame TTL held at 1. Accordingly, based on the TTL value of the outer frame, the source VTEP 137 transmits the third probe through the underlay network 103 to the VTEP 143. Based on ECMP routing of the routing hash of the 5-tuple of the dataflow, the path of the third probe will follow the identical path as the target dataflow indicated by dotted arrows 505. As VTEP 143 is the fourth hop, the third probe's outer header with a TTL will decrement to zero at and time-out at VTEP 143. In response to the timing-out of the TTL in the outer frame, the node VTEP 143 will drop the third probe and return another debugging message to the probe source that logs the information included in the debugging message. Additionally, the probe source can determine that the underlay network is resolved based on the destination IP address of the third probe being the same as that of the IP address of the VTEP 143 that is a last hop through the underlay network 103.

Still referring to FIG. 5C, the Traceroute session can generate and send a fourth instance of the probe data packet ("fourth probe") having an outer frame with a TTL value held constant and a middle frame with a TTL set to 1. The value of the outer frame TTL can be set at a value greater than or equal to the previous maximum value that traversed the underlay network (e.g., >4). Accordingly, based on the TTL value of the middle frame, the source VTEP 137 transmits the fourth probe through the overlay network 105 to the VTEP 143 though the virtual overlay tunnel 141. Based on the routing hash of the 5-tuple of the dataflow, the path of the fourth probe will follow the identical path as the target dataflow. As the VTEP 143 is the first hop of the fourth probe in the overlay network 105, the fourth probe's middle frame with a TTL of 1 will decrement to zero at the first hop and time-out at VTEP 143. In response to the timing-out of the TTL in the middle frame, the node VTEP 143 will return another debugging message to the probe source that logs the information included in the debugging message. Additionally, the probe source can determine that the underlay network is resolved based on the destination IP address of the fourth probe being the same as that of the IP address of the VTEP 143. Accordingly, the probe source proceeds to resolve the overlay network.

Figure 5D:
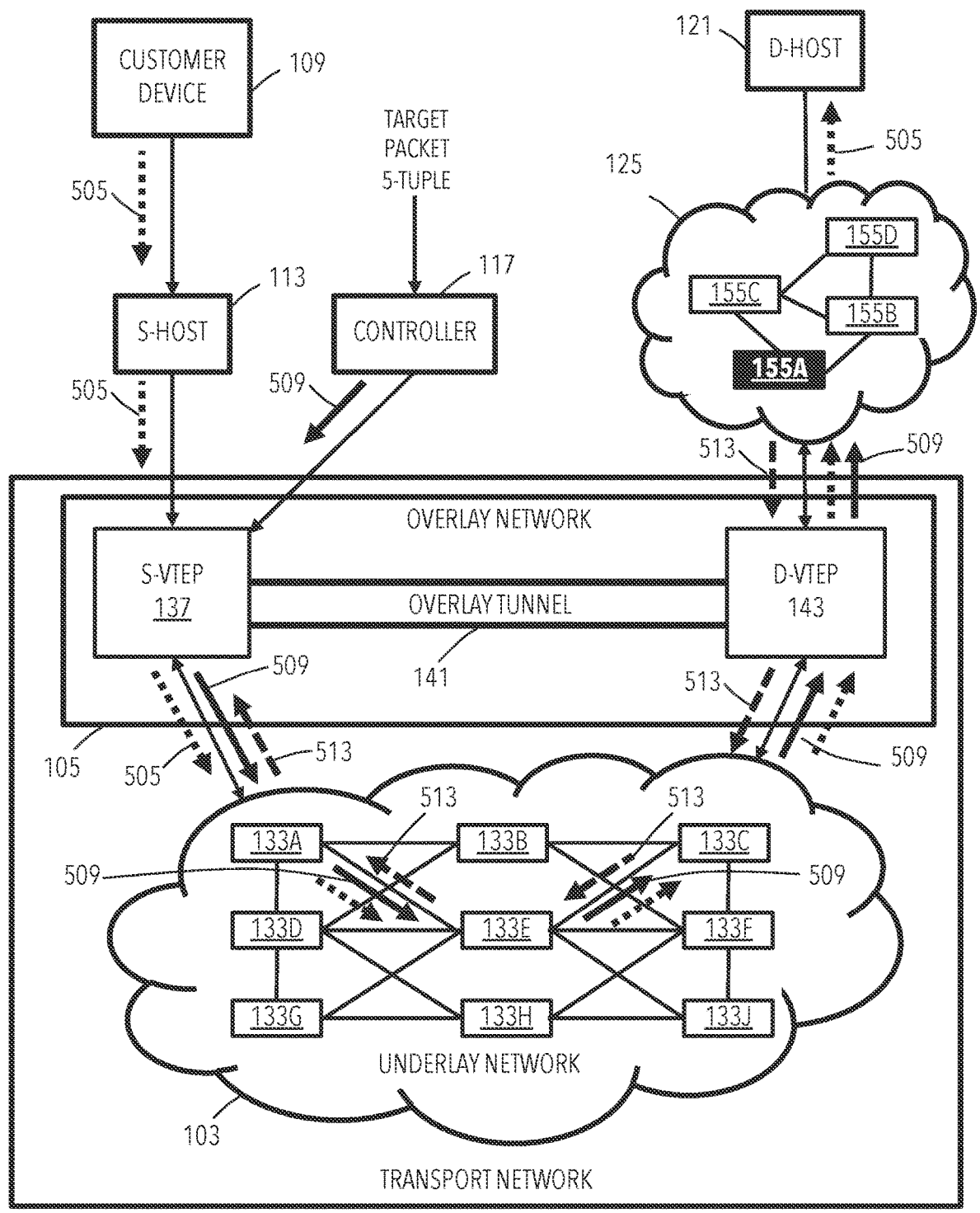

Referring to FIG. 5D, the Traceroute session can generate and send a fifth instance of the probe data packet ("fifth probe") having an outer frame with the TTL value still held constant and a middle frame with a TTL set to 2. Based on the TTL value of the middle frame, the source VTEP 137 transmits the fifth probe through the overlay network 105 to the VTEP 143 though the virtual overlay tunnel 141. The VTEP 143 removes the outer frame and forwards the fifth probe with the middle frame to network 125. Based on the fifth probe's middle frame, the TTL will decrement to zero at the second hop of the overlay network 105 that is node 155A of the local network 125. In response to the timing-out of the TTL in the inner frame, the node 155A will return a debugging message to the probe source that logs the debugging message in the same manner as previously described.

Figure 5E:
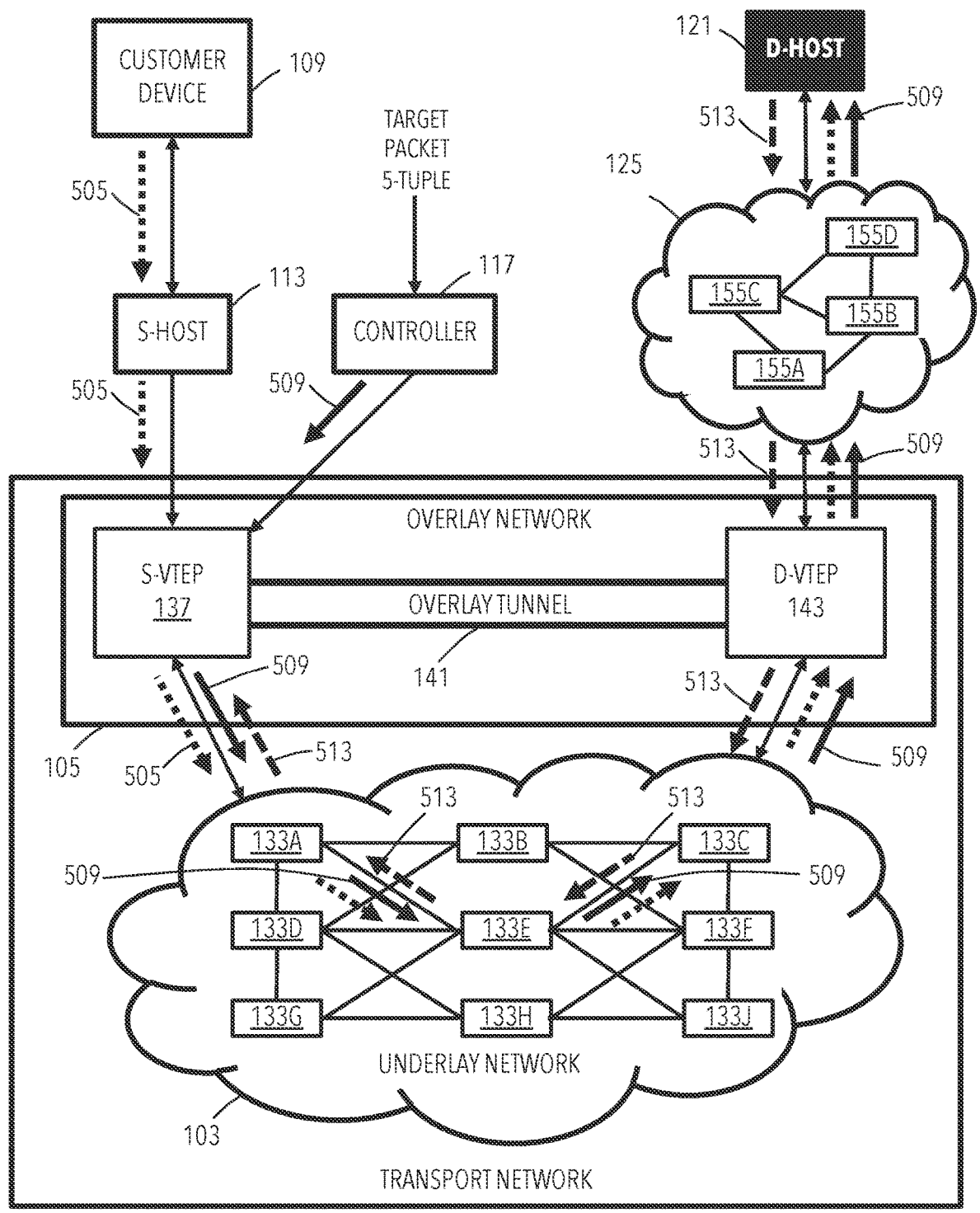

Referring to FIG. 5E, the Traceroute session can generate and send a sixth instance of the probe data packet ("sixth probe") having an outer frame with the TTL value still held constant and a middle frame with a TTL set to 5. Based on the TTL value of the middle frame, the source VTEP 137 transmits the sixth probe through the overlay network 105 to the VTEP 143 though the virtual overlay tunnel 141. The VTEP 143 removes the outer frame and forwards the sixth probe to network 125. Based on the sixth probe's middle frame, the TTL will decrement to zero at the fifth hop of the overlay network 105 that is destination host 121. In response to the timing-out of the TTL in the middle frame, destination host 121 may return debugging message to the probe source that logs the debugging message in the same manner as previously described. Additionally, the probe source can determine that the overlay network is resolved based on the destination IP address of the sixth probe being the same as that of the IP address of the destination host 121.

Using the debugging message logged in response to the first through sixth probe packets, the probe source can generate a report comprising an ordered list of components traversed by the probe packets representing the dataflow of the customer packet, as indicated by dotted lines 505. The probe source can output the report to a network administrator through a computer-users interface, such as controller 117.

9. Computer Networks and Cloud Networks

In one or more embodiments, a computer network (e.g., transport network 101) provides connectivity among a set of nodes (e.g., nodes 133). The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application and/or storage of a particular amount of data). A server process responds by executing the requested service and/or returning corresponding data.

The computer network may be an overlay network, such as an MPLS network or a VXLAN. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single, logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

10. Hardware Overview

According to one embodiment, the techniques described herein are implemented by one or more special-purpose computing devices. The special-purpose computing devices may be hard-wired to perform the techniques, or they may include digital electronic devices such as one or more application-specific integrated circuits (ASICs), field programmable gate arrays (FPGAs), or network processing units (NPUs) that are persistently programmed to perform the techniques. Additionally, the special-purpose computing devices may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices, or any other device that incorporates hard-wired and/or program logic to implement the techniques.

Figure 6:
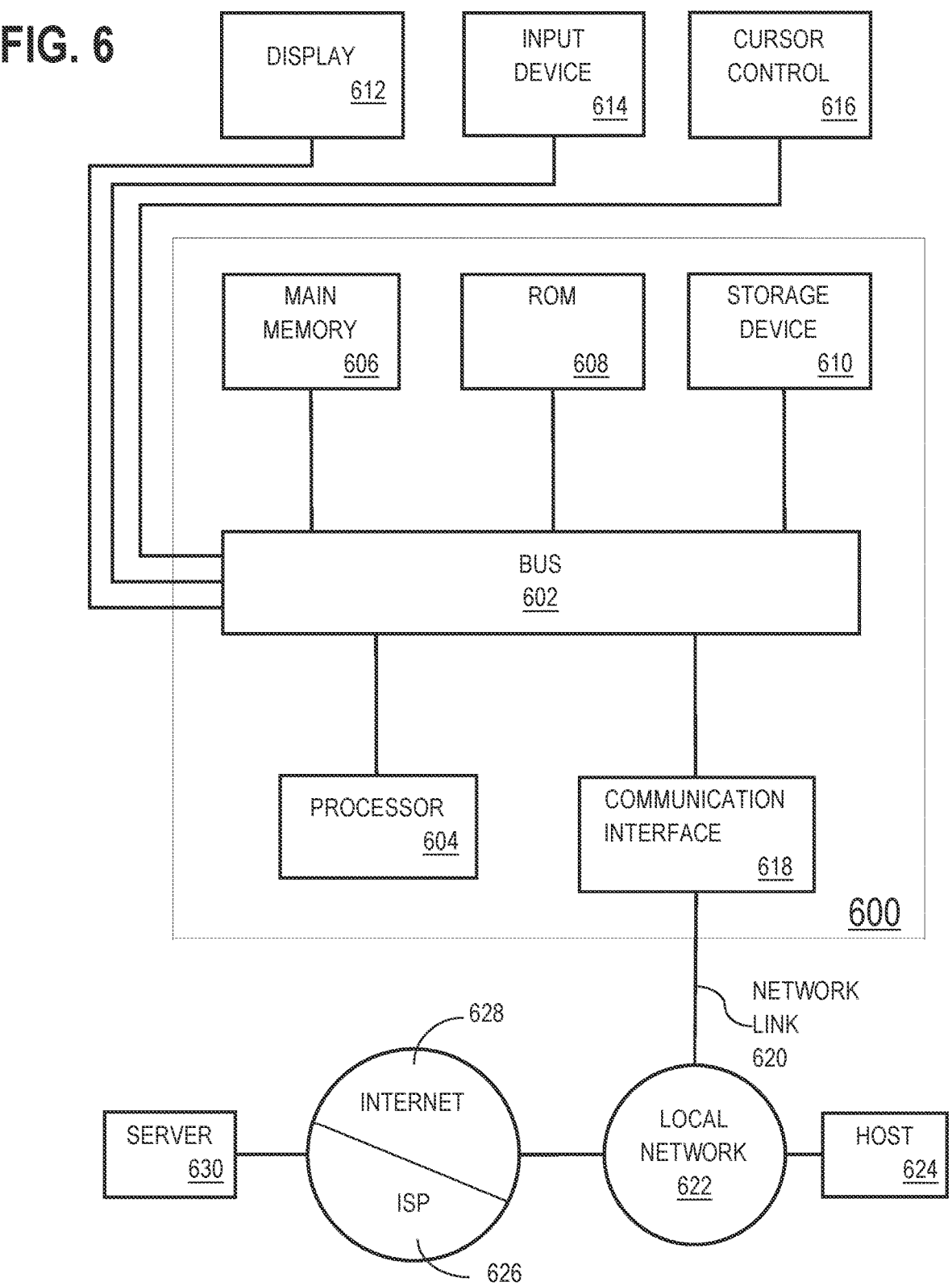
FIG. 6 illustrates a block diagram of a computer system in accordance with one or more embodiments.

For example, FIG. 6 is a block diagram that illustrates a computer system 600 which may implement an embodiment of the disclosure. Computer system 600 includes a bus 602 or other communication mechanism for communicating information and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allow the device to specify positions in a plane.

Computer system 600 may implement the techniques described herein using customized hard-wired logic, one or more ASICs or FPGAs, firmware and/or program logic that in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory such as main memory 606. Common forms of storage media include, for example, a floppy disk, flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire, and fiber optics, including the wires that comprise bus 602. Transmission media can also take the form of acoustic or light waves such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal, and appropriate circuitry can place the data on bus 602. Bus 602 carries the data to main memory 606, where processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card that provides a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. In turn, ISP 626 provides data communication services through the worldwide packet data communication network, commonly referred to as the "Internet" 628. Local network 622 and Internet 628 both use electrical, electromagnetic, or optical signals that carry digital data streams. The signals through the various networks and the signals on network link 620 and through communication interface 618 that carry the digital data to and from computer system 600 are example forms of transmission media.

Computer system 600 can send messages and receive data, including program code, through the network(s), network link 620, and communication interface 618. In the Internet example, a server 630 might transmit a requested code for an application program through Internet 628, ISP 626, local network 622, and communication interface 618.

The received code may be executed by processor 604 as it is received and/or stored in storage device 610 or other non-volatile storage for later execution.

11. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions that, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. Accordingly, the specification and drawings are to be regarded in an illustrative rather than a restrictive sense. The sole and exclusive indicator of the scope of the disclosure, and what is intended by the applicants to be the scope of the disclosure, is the literal and equivalent scope of the set of claims that issue from this application in the specific form where such claims issue, including any subsequent correction.

What is claimed is:

1. One or more non-transitory computer readable media comprising instructions which, when executed by one or more hardware processors, cause the one or more hardware processors to perform operations comprising:
    receiving a request to trace a route of a dataflow through a transport network, wherein:
        the transport network comprises an overlay network and an underlay network, and
        the dataflow comprises a data packet, the data packet comprising a data packet header identifying a first destination address for the data packet;
    transmitting a first set of probe packets along the route of the dataflow based at least in part on the data packet header;
    transmitting a second set of probe packets along the route of the dataflow based at least in part on the data packet header,
        wherein each probe packet of the first and second sets of probe packets comprises a probe packet header identifying a second destination address, the second destination address being identical to the first destination address for the data packet; and
        wherein each probe packet of the first and second sets of probe packets includes an underlay Time-To-Live (TTL) value and an overlay TTL value, the first set of probe packets comprising different underlay TTL values and the second set of probe packets comprising different overlay TTL values;
    receiving, from a first intermediate node at which a first probe packet of the first set of probe packets is dropped along the route of the dataflow based on the underlay TTL value of the first probe packet expiring, a first response message corresponding to the first probe packet being dropped at the first intermediate node;
    receiving, from a second intermediate node at which a second probe packet of the second set of probe packets is dropped along the route of the dataflow based on the overlay TTL value of the second probe packet expiring, a second response message corresponding to the second probe packet being dropped at the second intermediate node; and
    based at least on the first response message and the second response message: determining at least a portion of the route of the dataflow through the transport network, the portion of the route comprising the first intermediate node and the second intermediate node.

2. The one or more non-transitory computer readable media of claim 1, wherein the operations further comprise:
    resolving the underlay network based at least in part on the transmitted first set of probe packets the first set of probe packets comprising constant overlay TTL values; and
    resolving the overlay network based at least in part on the transmitted second set of probe packets, the second set of probe packets comprising constant underlay TTL values.

3. The one or more non-transitory computer readable media of claim 1, wherein:
    transmitting the first probe packet of the plurality first set of probe packets comprises:
        transmitting the first probe packet using the underlay network; and
        receiving the first response message from the first intermediate node in the underlay network.

4. The one or more non-transitory computer readable media of claim 1, wherein:
    transmitting the second probe packet of the second set of probe packets comprises:
        transmitting the second probe packet using the overlay network; and
        receiving the second response message from the second intermediate node in the overlay network.

5. The one or more non-transitory computer readable media of claim 1, wherein the data packet header comprises a 5-tuple including a source address for the data packet.

6. The one or more non-transitory computer readable media of claim 5, wherein the operations further comprise:
    constructing the first and second sets of probe packets based at least in part on a hash value of the 5-tuple.

7. The one or more non-transitory computer readable media of claim 6, wherein the probe packet header of each probe packet of the first and second sets of probe packets comprises:
    an underlay header including (a) the underlay TTL value and (b) the hash value of the 5-tuple; and
    an overlay header including (a) the overlay TTL value, and (b) an additional source address different than the source address for the data packet.

8. A system comprising a hardware processor and computer-readable program instructions that, when executed by the hardware processor, control the system to perform operations, the operations comprising:
    receiving a request to trace a route of a dataflow through a transport network, wherein:
        the transport network comprises an overlay network and an underlay network, and
        the dataflow comprises a data packet, the data packet comprising a data packet header identifying a first source address for the data packet and a first destination address for the data packet;
    constructing a plurality of probe packets based at least in part on the data packet header, wherein each probe packet of the plurality of probe packets comprises a probe packet header identifying a second destination address, the second destination address being identical to the first destination address for the data packet;

wherein each probe packet of the plurality of probe packets is constructed with an underlay Time-To-Live (TTL) value in an underlay header and an overlay TTL value in an overlay header; and wherein each probe packet of the plurality of probe packets is constructed with a second source address, the second source address of each probe packet of the plurality of probe packets being different than the first source address for the data packet;

transmitting a first probe packet of the plurality of probe packets, wherein the first probe packet is routed along the route of the dataflow until a first TTL value corresponding to the first probe packet expires;

receiving, from a first intermediate node at which the first probe packet is dropped along the route of the dataflow, a first response message corresponding to the first probe packet being dropped at the first intermediate node;

transmitting a second probe packet of the plurality of probe packets, wherein the second probe packet is routed along the route of the dataflow until a second TTL value corresponding to the second probe packet expires;

receiving, from a second intermediate node at which the second probe packet is dropped along the route of the dataflow, a second response message corresponding to the second probe packet being dropped at the second intermediate node; and based at least on the first response message and the second response message: determining at least a portion of the route of the dataflow through the transport network, the portion of the route comprising the first intermediate node and the second intermediate node.

9. The system of claim 8, wherein the operations further comprise:

transmitting a first set of probe packets, including the first probe packet, of the plurality of probe packets through the underlay network, the first set of probe packets comprising different underlay TTL values and constant overlay TTL values; and transmitting a second set of probe packets, including the second probe packet, of the plurality of probe packets through the overlay network, the second set of probe packets comprising different overlay TTL values and constant underlay TTL values.

10. The system of claim 8, wherein:

the first TTL value corresponding to the first probe packet is the underlay TTL value of the first probe packet; and transmitting the first probe packet of the plurality of probe packets comprises:

transmitting the first probe packet using the underlay network; and receiving the first response message from the first intermediate node in the underlay network.

11. The system of claim 10, wherein the operations further comprise:

transmitting a third probe packet of the plurality of probe packets, wherein the third probe packet is routed along the route of the dataflow until the overlay TTL value of the third probe packet expires; and receiving, from a third intermediate node at which the third probe packet is dropped along the route of the dataflow, a third response message corresponding to the third probe packet being dropped at the third intermediate node on the overlay network.

12. The system of claim 8, wherein the data packet header comprises a 5-tuple including the first source address for the data packet.

13. The system of claim 12, wherein constructing the plurality of probe packets based at least in part on the data packet header further comprises determining a hash value of the 5-tuple.

14. The system of claim 13, wherein the probe packet header of each probe packet of the plurality of probe packets comprises the hash value of the 5-tuple in the underlay header.

15. A method comprising:

receiving a request to trace a route of a dataflow through a transport network, wherein:

the transport network comprises an overlay network and an underlay network, and the dataflow comprises a data packet, the data packet comprising a data packet header identifying a first destination address for the data packet;

transmitting a first set of probe packets through the underlay network based at least in part on the data packet;

transmitting a second set of probe packets through the overlay network based at least in part on the data packet, wherein each probe packet of the first and second sets of probe packets comprises a probe packet header identifying a second destination address, the second destination address being identical to the first destination address for the data packet; and wherein each probe packet of the first and second sets of probe packets includes an underlay Time-To-Live (TTL) value and an overlay TTL value, the first set of probe packets comprising different underlay TTL values and constant overlay TTL values and the second set of probe packets comprising different overlay TTL values and constant underlay TTL values;

receiving, from a first intermediate node at which a first probe packet of the first set of probe packets is dropped along the route of the dataflow, a first response message from corresponding to the first probe packet being dropped at the first intermediate node;

receiving, from a second intermediate node at which a second probe packet of the second set of probe packets is dropped along the route of the dataflow, a second response message corresponding to the second probe packet being dropped at the second intermediate node; and based at least on the first response message and the second response message: determining at least a portion of the route of the dataflow through the transport network, the portion of the route comprising the first intermediate node and the second intermediate node.

16. The method of claim 15, further comprising:

resolving the underlay network based at least in part on the transmitted first set of probe packets; and resolving the overlay network based at least in part on the transmitted second set of probe packets.

17. The method of claim 15, wherein:

transmitting the first probe packet of the first set of probe packets comprises:

transmitting the first probe packet using the underlay network; and receiving the first response message from the first intermediate node in the underlay network.

18. The method of claim 15, wherein:

transmitting the second probe packet of the second set of probe packets comprises:
  transmitting the second probe packet using the overlay network; and
  receiving the second response message from the second intermediate node in the overlay network.

19. The method of claim 15, wherein the data packet header comprises a 5-tuple including a source address for the data packet.

20. The method of claim 19, wherein the probe packet header of each probe packet of the first and second sets of probe packets comprises:
  an underlay header including (a) the underlay TTL value and (b) a hash value of the 5-tuple; and
  an overlay header including (a) the overlay TTL value, and (b) an additional source address different than the source address for the data packet.

\* \* \* \* \*